United States Patent
Lau et al.

(12) 
(10) Patent No.: US 6,681,043 B1
(45) Date of Patent: Jan. 20, 2004

(54) INTERACTIVE VIDEO OBJECT PROCESSING ENVIRONMENT WHICH VISUALLY DISTINGUISHES SEGMENTED VIDEO OBJECT

(75) Inventors: Christopher Lau, Seattle, WA (US); Donglok Kim, Seattle, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/375,825

(22) Filed: Aug. 16, 1999

(51) Int. Cl.$^7$ ................................................ G06K 9/34
(52) U.S. Cl. ........................ 382/173; 382/190; 382/235
(58) Field of Search .................................. 382/235, 173, 382/190; 345/473, 418, 440, 474; 709/328; 707/500.1; 348/171

(56) References Cited

U.S. PATENT DOCUMENTS

| | | | |
|---|---|---|---|
| 4,782,384 A | * 11/1988 | Tucker et al. ................. 358/22 |
| 5,038,383 A | * 8/1991 | Usumoto et al. ............. 382/16 |
| 5,598,182 A | * 1/1997 | Berend et al. ............... 345/133 |
| 5,611,036 A | * 3/1997 | Berend et al. ............... 395/141 |
| 5,664,084 A | * 9/1997 | Smith .......................... 345/440 |
| 5,754,183 A | * 5/1998 | Berend et al. ............... 345/429 |
| 5,786,814 A | * 7/1998 | Moran et al. ................ 345/328 |
| 5,963,203 A | * 10/1999 | Goldberg et al. ........... 345/328 |
| 6,061,064 A | * 5/2000 | Reichlen ..................... 345/418 |
| 6,144,375 A | * 11/2000 | Jain et al. .................... 345/302 |
| 6,215,505 B1 | * 4/2001 | Minami et al. .............. 345/473 |
| 6,237,045 B1 | * 5/2001 | Enomoto ..................... 709/328 |
| 6,414,686 B1 | * 7/2002 | Protheroe et al. ........... 345/474 |

FOREIGN PATENT DOCUMENTS

| | | | | |
|---|---|---|---|---|
| JP | 363115279 | * 5/1988 | ........... G06F/15/70 |
| JP | 406259554 | * 9/1994 | ........... G06F/15/70 |
| JP | 410149449 | * 6/1998 | ............ G06T/7/20 |

OTHER PUBLICATIONS

Adobe Plug–in Component Architecture PICA. The Adobe PICA API Reference; Version 1.1 3/97.

Foley et al.; Second Edition in C—Computer Graphics Principles and Practice; Section 12.7 (Constructive Solid Geometry) pp. 557–558; published 1996.

Information technology—Generic Coding of audio–visual objects—Part 2: Visual; ISO/IEC 1998.

* cited by examiner

*Primary Examiner*—Anh Hong Do
(74) *Attorney, Agent, or Firm*—Steven P. Koda

(57) ABSTRACT

A video processing environment includes a user interface and processing shell from which various video processing 'plug-in' programs are accessed. The shell insulates the plug-ins from the intricacies of reading various file formats. The user interface allows an operator to load a video sequence, define and view one or more video objects on any one or more frames of the video sequence, edit existing video object segmentations, view video objects across a series of video frames, and encode video objects among a video sequence in a desired format. Various encoding parameters can be adjusted allowing the operator to view the video sequence encoded at the various parameter settings. The user interface includes a video window, a time-line window, a zoom window, a set of menus including a menu of plug-in programs, and a set of dialogue boxes, including encoding parameter dialogue boxes.

22 Claims, 6 Drawing Sheets

INTERACTIVE VIDEO OBJECT PROCESSING ENVIRONMENT WHICH VISUALLY DISTINGUISHES SEGMENTED VIDEO OBJECT

CROSS REFERENCE TO RELATED APPLICATIONS

This invention is related to commonly-assigned U.S. patent application Ser. No. 09/323,501, filed Jun. 1, 1999 for "Video Object Segmentation Using Active Contour Modelling With Global Relaxation," of Shijun Sun and Yongmin Kim; commonly-assigned U.S. patent application Ser. No. 09/375,822, filed on the same day, for "Interactive Video Object Processing Environment Having Concurrently Acitve Subordinate Windows," of Christopher Lau et al.; and commonly-assigned U.S. patent application Ser. No. 09/375,822, filed on the same day, for "Interactive Video Object Processing Environment Having Zoom Window," of Christopher Lau et al. The content of all such applications are incorporated herein by reference and made a part hereof.

BACKGROUND OF THE INVENTION

This invention relates to user interfaces and interactive processing environments for video editing, and more particularly to an interactive processing environment for video object segmentation, tracking and encoding.

Graphical user interfaces having windows, buttons, dialogue boxes and menus are known, such as those available with the Apple Macintosh Operating System and the Microsoft Windows-based operating systems. The inventions disclosed herein relate to a graphical user interface adapted for video editing tasks, such as segmentation, tracking and encoding.

Segmentation is the division of an image into semantically meaningful non-overlapping regions. When segmenting video, the regions are referred to as video objects. Tracking is a method for identifying a video object across a series of video frames. Encoding is the compression and formatting of video according to some conventional or proprietary encoding scheme, such as the MPEG-4 encoding scheme.

SUMMARY OF THE INVENTION

According to the invention, a processing environment for video processing includes a user interface and processing shell from which various video processing 'plug-in' programs are executed. The user interface allows an operator to load a video sequence, define and view one or more video objects on any one or more of the frames of the video sequence, edit existing video object segmentations, view video objects across a series of video frames, and encode video objects among a video sequence in a desired format (e.g., MPEG-4 encoding). Various encoding parameters can be adjusted allowing the operator to view the video sequence encoded at the various parameter settings. One of the advantages of the processing environment is that an operator is able to do automatic segmentations across a sequence of video frames, rather than time consuming manual segmentations for each video frame.

According to one aspect of the invention, the user interface includes a main window from which subordinate windows are selectively displayed. Among the selectable subordinate windows are a video window, a time-line window, a zoom window, and an encoding window. The user interface also includes a set of menus including a menu of plug-in programs, and a set of dialogue boxes, including encoding parameter dialogue boxes. The video sequence is viewed and played in the video window using VCR-like controls. Video frames may be viewed in sequence or out of sequence (e.g., full motion video, stepping, or skipping around). The time-line window allows the operator to determine where within the sequence the current video frame is located.

According to another aspect of the invention, an operator may define an object by selecting a command button from the time-line window. The operator clicks on points in the video window to outline the portion of the displayed image which is to be the desired video object.

According to another aspect of this invention, the zoom window is concurrently active with the video window, while the operator defines the object. In particular, the pointing device cursor location is tracked concurrently in both the video window and the zoom window. Scrolling in the zoom window is automatic to track the pointing device cursor. One advantage of this is that the operator is able to view a location within the video frame, while also viewing a close-up of such location in the zoom window. This allows the operator to precisely place a point on a semantically-correct border of the object (e.g., at the border of an object being depicted in video). In some embodiments the zoom window shows a close-up of the pixels of the video window in the vicinity of the pointing device cursor.

According to another aspect of this invention, a segmentation plug-in program processes the video frame and selected outline to refine the object along semantical border lines of the object being depicted. The result is a video object.

According to another aspect of the invention, a defined video object is highlighted by one or more of the following schemes: overlaying a translucent mask which adds a user-selectable color shade to the object; outlining the object; viewing the rest of the frame in black and white, while viewing the object in color; altering the background to view the object alone against a solid (e.g., white, black, gray) background; applying one filter to the object and another filter to the background.

According to another aspect of the invention, an operator is able to select timepoints in the time-line window and a tracking algorithm from a plug-ins menu. The tracking algorithm identifies/extracts the defined object across a sequence of video frames. Thus, the operator is able to view the video sequence with highlighted object from a selected starting time point to a selected end time point. Alternatively, the operator may view just the video object (without the remaining portion of the video frames) from such selected starting to ending time points.

According to another aspect of the invention, the operator may step through the video frames from starting time point onward. The operator may stop or pause the stepping to adjust or redefine the video objects. An advantage of this aspect is that as the tracking algorithm begins to lose the ability to accurately track an object, the object can be redefined. For example, as some of the background begins to be included as part of the video object during tracking over multiple frames, the boundaries of the video object can be redefined. Further, the object can be redefined into one or more sub-objects, with each sub-object being tracked and displayed from frame to frame. An advantage of the plug-in interface is that a common or different segmentation plug-ins may be used to segment different objects. For example, one segmentation plug-in may be well adapted for segmenting objects in the presence of affine motion, while another segmentation plug-in is better where the object deforms. Each segmentation plug-in may be applied to an object for which it is most effective.

According to another aspect of the invention, the time-line window indicates which frames of a sequence have been processed to track/extract a video object.

According to another aspect of the invention, where sub-objects are being tracked the objects can be combined into a single object just before video encoding. The operator is able to select among a variety of encoding parameters, such as encoding bit rate, motion vector search range, and fidelity of the encoded shape.

According to another aspect of the invention, an encoding status of each object is displayed showing the peak signal to noise ratio for each color component of each frame and for the total number of bits encoded for each frame. An advantage of such display is that the operator is able to visualize how peak signal to noise ratio varies between video objects over a sequence of frames or how the total number of bits affects the peak signal to noise ratio of each color component of an object. When the image quality is unsatisfactory, these displays enable the operator to identify a parameter in need of adjusting to balance peak signal to noise ratio and the bit rate. For example, an operator is able to select a higher number of bits to encode one object and a lesser number of bits to encode another object to optimize image quality for a given number of bits.

According to an advantage of this invention, various processing needs can be met using differing plug-ins. According to another advantage of the invention, the processing shell provides isolation between the user interface and the plug-ins. Plug-ins do not directly access the video encoder. The plug-ins accomplish segmentation or tracking or another task by interfacing through an API—application program interface module. For example, a segmentation plug-in defines an object and stores the pertinent data in a video object manager portion of the shell. The encoder retrieves the video objects from the video object manager. Similarly, plug-ins do not directly draw segmentations on the screen, but store them in a central location. A graphical user interface module of the user interface retrieves the data from central location and draws the objects in the video window. As a result, the various plug-ins are insulated from the intricacies of reading various file formats. Thus, data can even be captured from a camcorder or downloaded over a network through the user interface and shell, without regard for plug-in compatibilities.

These and other aspects and advantages of the invention will be better understood by reference to the following detailed description taken in conjunction with the accompanying drawings.

DESCRIPTION OF SPECIFIC EMBODIMENTS

Overview

Figure 1:
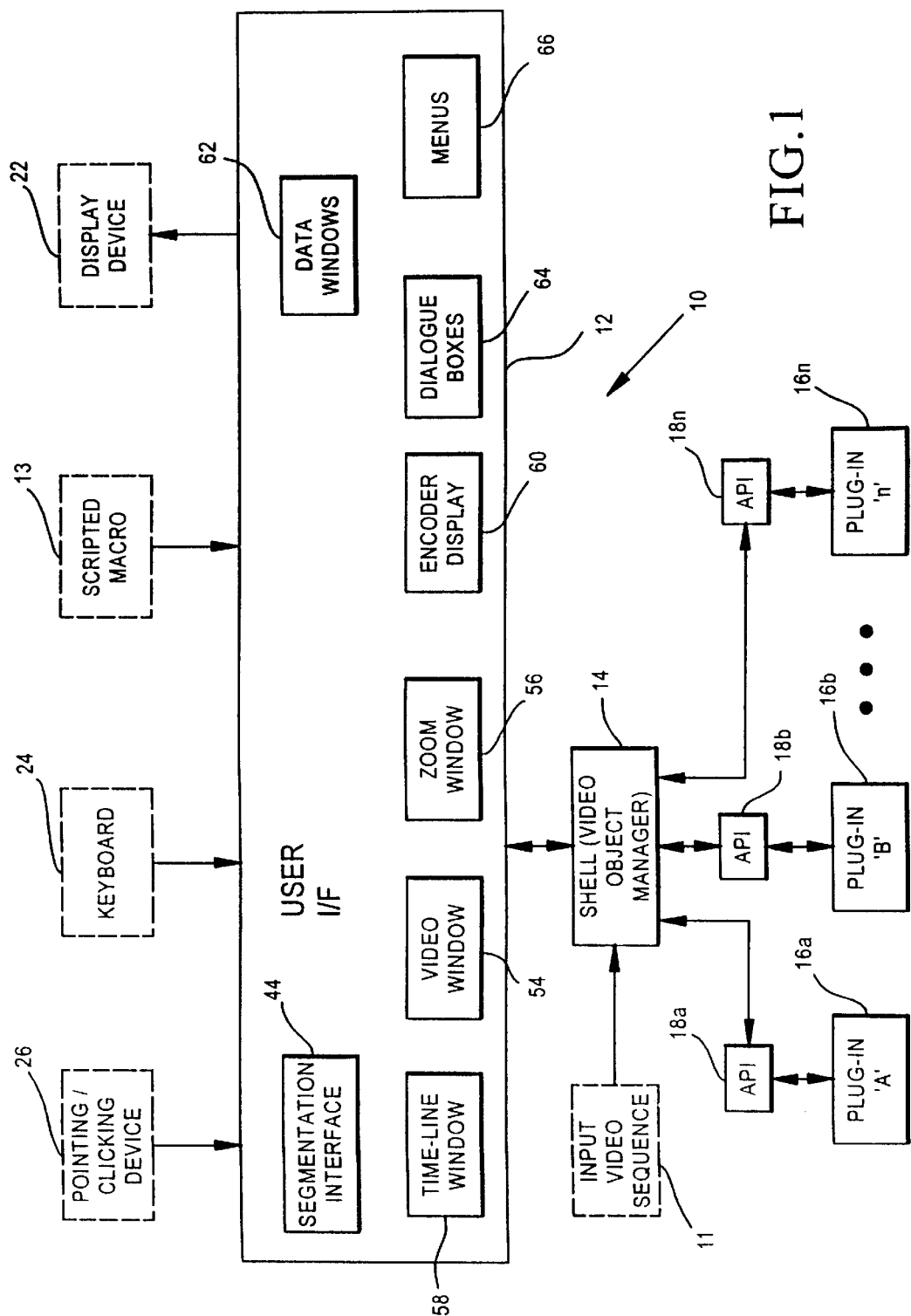
FIG. 1 is a block diagram of an interactive processing environment for video object segmentation, tracking and encoding according to an embodiment of this invention.

FIG. 1 shows a block diagram of an interactive processing environment 10 for segmenting, tracking and encoding video according to one embodiment of the invention. The processing environment 10 includes a user interface 12, a shell environment 14 and a plurality of functional software 'plug-in' programs 16. The user interface receives and distributed operator inputs from various input sources, such as a point and clicking device 26 (e.g., mouse, touch pad, track ball), a key entry device 24 (e.g., a keyboard), or a prerecorded scripted macro 13. The user interface 12 also controls formatting outputs to a display device 22. The shell environment 14 controls interaction between plug-ins 16 and the user interface 12. An input video sequence 11 is input to the shell environment 14. Various plug-in programs 16a–16n may process all or a portion of the video sequence 11. One benefit of the shell 14 is to insulate the plug-in programs from the various formats of potential video sequence inputs. Each plug-in program interfaces to the shell through an application program interface ('API') module 18.

Figure 2:
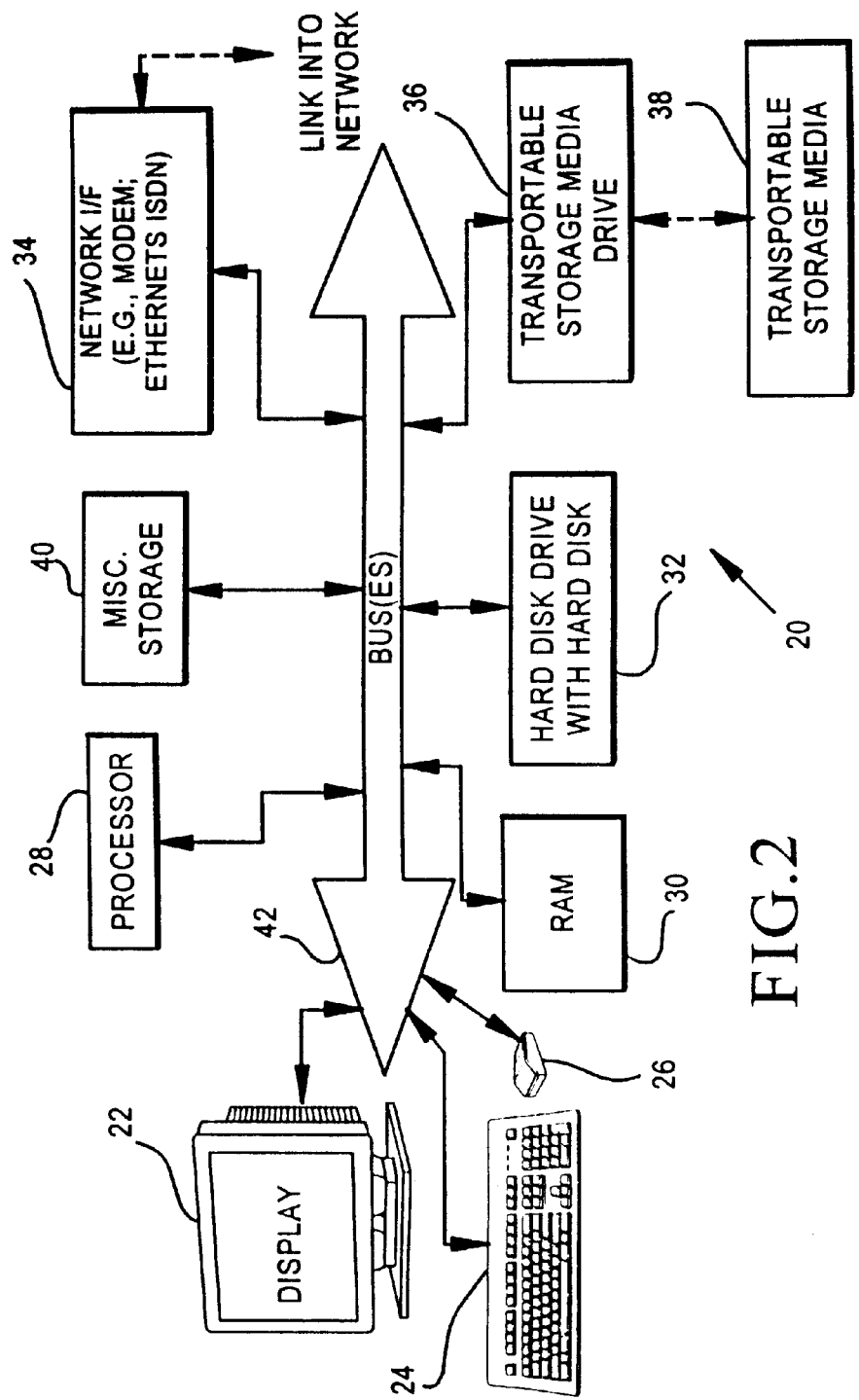
FIG. 2 is a block diagram of an exemplary host computing system for the interactive processing environment of FIG. 1.

In one embodiment the interactive processing environment 10 is implemented on a programmed digital computer of the type which is well known in the art, an example of which is shown in FIG. 2. A computer system 20 has a display 22, a key entry device 24, a pointing/clicking device 26, a processor 28, and random access memory (RAM) 30. In addition there commonly is a communication or network interface 34 (e.g., modem; ethernet adapter), a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more buses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer, a networked client computer or a stand alone computer. The computer system 20 may even be configured as a workstation, personal computer, or a reduced-feature network terminal device.

In another embodiment the interactive processing environment 10 is implemented in an embedded system. The embedded system includes similar digital processing devices and peripherals as the programmed digital computer described above. In addition, there are one or more input devices or output devices for a specific implementation, such as image capturing.

In a best mode embodiment software code for implementing the user interface 12 and shell environment 14, including computer executable instructions and computer readable data are stored on a digital processor readable storage media, such as embedded memory, RAM, ROM, a hard disk, an optical disk, a floppy disk, a magneto-optical disk, an electro-optical disk, or another known or to be implemented transportable or non-transportable processor readable storage media. Similarly, each one of the plug-ins 16 and the corresponding API 18, including digital processor executable instructions and processor readable data are stored on a processor readable storage media, such as embedded memory, RAM, ROM, a hard disk, an optical disk, a floppy disk, a magneto-optical disk, an electro-optical disk, or another known or to be implemented transportable or non-transportable processor readable storage media. The plug-ins 16 (with the corresponding API 18) may be bundled individually on separate storage media or together on a common storage medium. Further, none, one or more of the plug-ins 16 and the corresponding API's 18 may be bundled with the user interface 12 and shell environment 14. Further, the various software programs and plug-ins may be distributed or executed electronically over a network, such as a global computer network.

Under various computing models, the software programs making up the processing environment 10 are installed at an end user computer or accessed remotely. For stand alone computing models, the executable instructions and data may be loaded into volatile or non-volatile memory accessible to the stand alone computer. For non-resident computer models, the executable instructions and data may be processed locally or at a remote computer with outputs routed to the local computer and operator inputs received from the local computer. One skilled in the art will appreciate the many computing configurations that may be implemented. For non-resident computing models, the software programs may be stored locally or at a server computer on a public or private, local or wide area network, or even on a global computer network. The executable instructions may be run either at the end user computer or at the server computer with the data being displayed at the end user's display device.

Shell Environment

The shell environment 14 allows an operator to work in an interactive environment to develop, test or use various video processing and enhancement tools. In particular, plug-ins for video object segmentation, video object tracking and video encoding (e.g., compression) are supported in a preferred embodiment. Differing segmentation algorithms can be developed, tested and implemented as plug-ins 16 for researcher or end user implementation. Similarly, different tracking algorithms and tracking schemes can be implemented as plug-ins 16 to track and extract video object data from a sequence of video frames. The interactive environment 10 with the shell 14 provides a useful environment for creating video content, such as MPEG-4 video content or content for another video format. A pull-down menu or a pop up window is implemented allowing an operator to select a plug-in to process one or more video frames.

According to a preferred embodiment the shell 14 includes a video object manager. A plug-in program 16, such as a segmentation program accesses a frame of video data, along with a set of user inputs through the shell environment 14. A segmentation plug-in program identifies a video object within a video frame. The video object data is routed to the shell 14 which stores the data within the video object manager module. Such video object data then can be accessed by the same or another plug-in 16, such as a tracking program. The tracking program identifies the video object in subsequent video frames. Data identifying the video object in each frame is routed to the video object manager module. In effect video object data is extracted for each video frame in which the video object is tracked. When an operator completes all video object extraction, editing or filtering of a video sequence, an encoder plug-in 16 may be activated to encode the finalized video sequence into a desired format. Using such a plug-in architecture, the segmentation and tracking plug-ins do not need to interface to the encoder plug-in. Further, such plug-ins do not need to support reading of several video file formats or create video output formats. The shell handles video input compatibility issues, while the user interface handles display formatting issues. The encoder plug-in handles creating a run-time video sequence.

For a Microsoft Windows operating system environment, the plug-ins 16 are compiled as dynamic link libraries. At processing environment 10 run time, the shell 14 scans a predefined directory for plug-in programs. When present, a plug-in program name is added to a list which is displayed in a window or menu for user selection. When an operator selects to run a plug-in 16, the corresponding dynamic link library is loaded into memory and a processor begins executing instructions from one of a set of pre-defined entry points for the plug-in. To access a video sequence and video object segmentations, a plug-in uses a set of callback functions. A plug-in interfaces to the shell program 14 through a corresponding application program interface module 18.

In addition, there is a segmentation interface 44 portion of the user interface 12 which is supported by a segmentation plug-in. The segmentation interface 44 makes calls to a segmentation plug-in to support operator selected segmentation commands (e.g., to execute a segmentation plug-in, configure a segmentation plug-in, or perform a boundary selection/edit).

The API's 18 typically allow the corresponding plug-in to access specific data structures on a linked need-to-access basis only. For example, an API serves to fetch a frame of video data, retrieve video object data from the video object manager, or store video object data with the video object manager. The separation of plug-ins and the interfacing through API's allows the plug-ins to be written in differing program languages and under differing programming environments than those used to create the user interface 12 and shell 14. In one embodiment the user interface 12 and shell 14 are written in C++. The plug-ins can be written in any language, such as the C programming language.

In a preferred embodiment each plug-in 16 is executed in a separate processing thread. As a result, the user interface 12 may display a dialog box that plug-ins can use to display progress, and from which a user can make a selection to stop or pause the plug-in's execution.

User-Interface Windows

Figure 3:
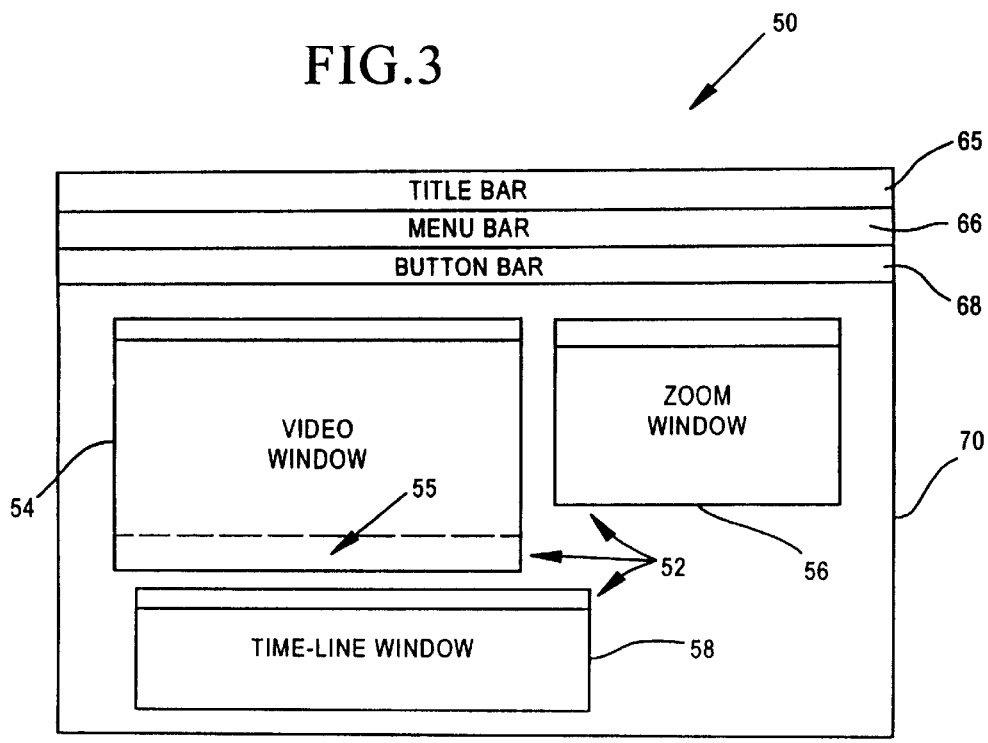
FIG. 3 is a window depiction of a main user interface window according to an embodiment of this invention.

Referring to FIGS. 1 and 3, the user interface 12 includes the segmentation interface 44 and various display windows 54–62, dialogue boxes 64, menus 66 and button bars 68, along with supporting software code for formatting and maintaining such displays. In a preferred embodiment as shown in FIG. 3, the user interface is defined by a main window 50 within which a user selects one or more subordinate windows 52, each of which may be concurrently active at a given time. The subordinate windows 52 may be opened or closed, moved and resized. The main window 50 includes a title bar 65, a menu bar 66 and a button bar 68. In some embodiments the various bars 65–68 may be hidden or viewed at the operator's preference. The main window also includes a window area 70 within which the subordinate windows 52 and dialogue boxes 64 may be viewed.

In a preferred embodiment there are several subordinate windows 52, including a video window 54, a zoom window 56, a time-line window 58, one or more encoder display windows 60, and one or more data windows 62. The video window 54 displays a video frame or a sequence of frames. For viewing a sequence of frames, the frames may be stepped, viewed in real time, viewed in slow motion or viewed in accelerated time. Included are input controls accessible to the operator by pointing and clicking, or by predefined key sequences. There are stop, pause, play, back, forward, step and other VCR-like controls for controlling the video presentation in the video window 54. In some embodiments there are scaling and scrolling controls also for the video window 54.

The zoom window 56 displays a zoom view of a portion of the video window 54 at a substantially larger magnification than the video window. The portion displayed in the zoom window 56 is automatically determined according to the position of the pointing device 26 cursor. As the operator moves the pointing device cursor, the zoom window scrolls to follow the cursor and maintain the cursor within the zoom window 56. In a preferred embodiment, the zoom window 56 supporting software keeps the pointing device cursor approximately centered. The purpose of the zoom window 56 is to allow the operator to see down to the pixel level of the video window 54. In doing so, an operator is able to click on a very specific point of the video window 54. More particularly, an operator can accurately place a boundary point of an image object, so as to provide a semantically accurate input for segmenting a video object. By "semantically accurate" it is meant that a selected point can be accurately placed at the image border of an object image (e.g., the edge of a house, tree, hand, or other image object being viewed).

Figure 4:
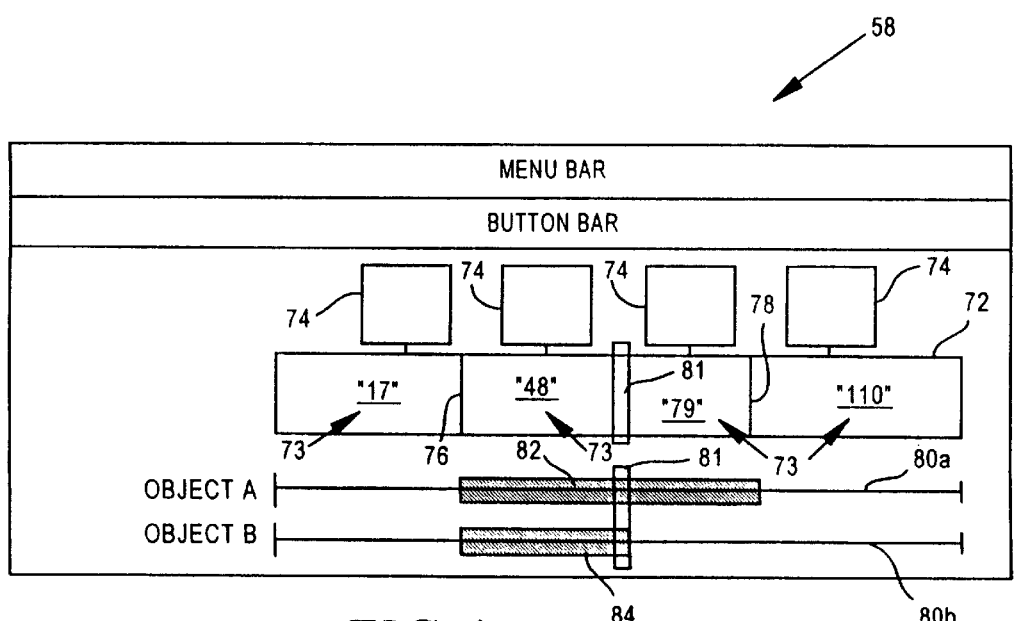
FIG. 4 is a window depiction of a time-line subordinate window of the user interface of FIG. 3 according to one embodiment of this invention.

Referring to FIG. 4, the time-line window 58 includes an incremental time-line 72 of video frames, along with zero or more thumb nail views 74 of select video frames. The operator may click on any point along the time-line 72 and the corresponding image frame is displayed in the video window 54. The frames corresponding to the thumb nail views 74 are selected manually by the operator or automatically. The location and number 73 of such frames are marked on the time-line 72.

The operator also can select a starting frame and an ending frame to view a clip of the input video sequence and define the processing range. Such selections are highlighted along the time-line 72. In one embodiment the line 76 designates the starting frame and the line 78 designates the ending frame. The operator selects the starting and ending points 76, 78 then selects 'play' to play the video clip or 'segment' to track objects.

The time line window 58 also includes a respective time-line 80 for each video object defined for the input video sequence 11. A video object is defined by outlining the object followed by segmenting the object. The outlining provides a course user-selected boundary of the object. The zoom window allows accurate selection of points along such boundary. In one embodiment there are two outlining modes. In one mode the user draws the entire outline in a continuous mouse motion by holding down a mouse button. In another mode, the user clicks on various border points of the object. Double-clicking is used to signal enclosing of an object in the user-defined polygon. Editing options allow the operator to move the entire outline, add additional points between previously selected points, or remove previously selected points. During segmentation, the object boundary is refined to define the video object more accurately.

As a video object is tracked from frame to frame using a tracking plug-in, the corresponding time-line 80 highlights the frames for which such video object has been identified, tracked, and extracted. In particular, the video object data is extracted for each frame in which the object is tracked and stored with the video object manager. For example, the time-line window depicted in FIG. 4 shows a time-line 80a for a video object A and another time-line 80b for a video object B. As shown both objects were defined or tracked to the same starting frame denoted on time-line 72 by line 76. Video object A data was extracted all the way to the ending frame (note line 78) of the video clip. Markings 82 provide a visual cue to convey such information to the operator. Video object B data was extracted for only a portion of the excerpt as depicted by the markings 84. The time-lines 72 and 80 also include a marker 81 which indicates the current frame being viewed in the video window 54.

Figure 5:
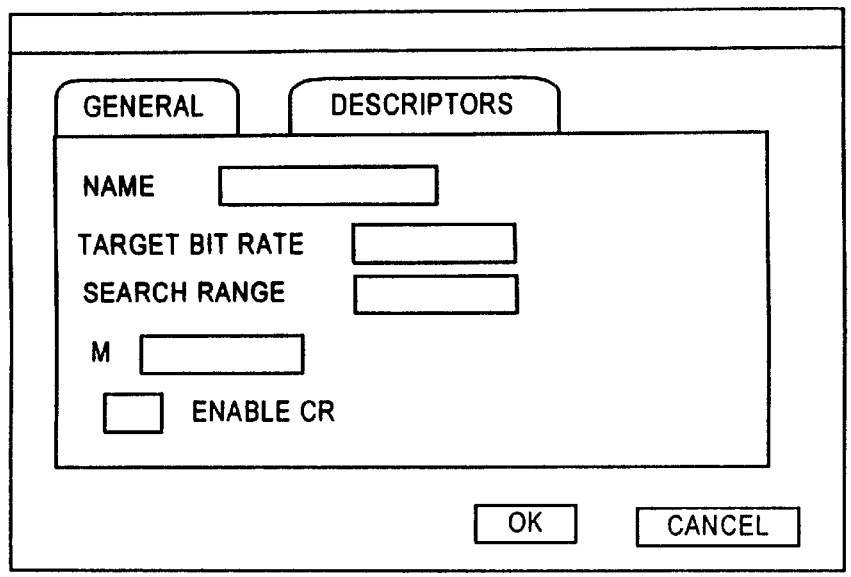
FIG. 5 is a window depiction of a video object information subordinate window of the user interface of FIG. 3 according to one embodiment of this invention.

Referring to FIG. 5, a data window 62 is shown for a given video object. In one embodiment, the operator merely double clicks on the object name in the time-line window 58 or on the object in the video window 54 (or enters some other predefined input), which causes the data window 62 for such video object to appear. The data window 62 includes user-input fields for an object title, translucent mask color, encoding target bit rate, search range and other parameters for use in defining and encoding the corresponding video object.

Figure 6:
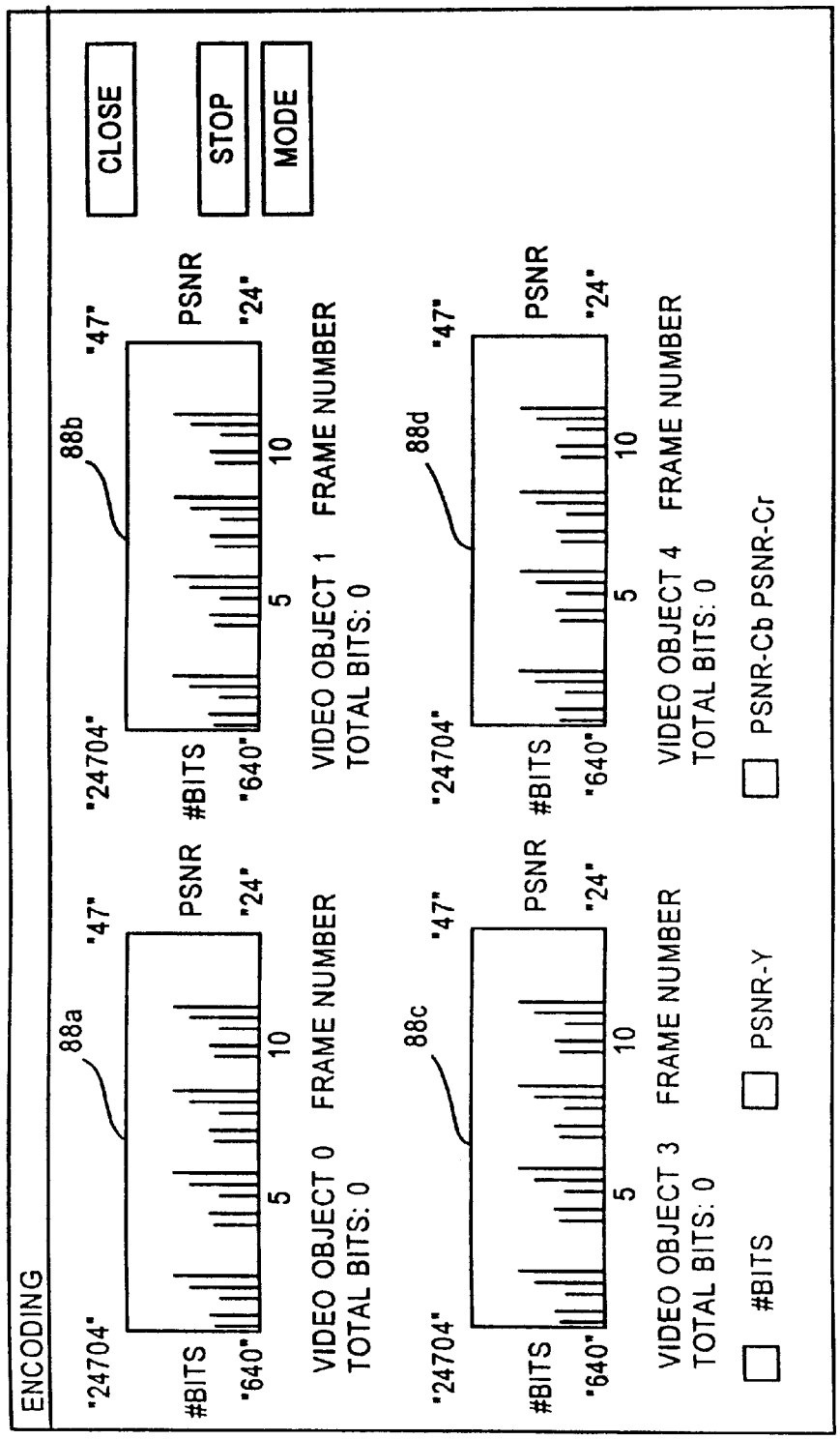
FIG. 6 is a window depiction of an encoder progress subordinate window of the user interface of FIG. 3 according to one embodiment of this invention.

Referring to FIG. 6, during encoding an encoder progress window 86 is displayed. The encoder progress window 86 is one of the encoder displays 60, and shows the encoding status for each defined video object in the input video sequence 11. In one embodiment there is a respective information area 88 displaying the number of encoding bits versus frame number and a peak signal to noise ratio (PSNR) versus frame number for each video object. In the display areas 88 depicted, there is a set of bar graphs at each interval of select frame number intervals. One bar at each interval corresponds to the number of bits encoded, another corresponds to the overall PSNR of the frame's pixel data, another corresponds to the PSNR for the Y component of the frame's pixel data, another corresponds to the PSNR for the Cb color component of the frame's pixel data and a fourth corresponds to PSNR for the Cr color component of the frame's pixel data. One skilled in the art will appreciate that there are many formats in which such information and additional encoding information may be displayed to the operator. The bar graphs allow the operator to visualize how PSNR varies among video objects over a sequence of frames or how PSNR for a given component varies among video objects over a sequence of frames. In addition, by presenting information for each Y, Cb and Cr components separately, the operator can visualize how the total bit rate affects the PSNR of each component of an object. When the image quality or the amount of compression is not satisfactory, the operator can view the graphs to aid in determining which parameters to adjust to achieve a more desirable balance between the PSNR and bit rate results before running the encoder again.

Exemplary Plug-Ins

In a preferred embodiment, there is a Video Object Segmentation plug-in 16a, a Video Object Tracking plug-in 16b and an MPEG-4 plug-in 16n. An exemplary embodiment for each of the segmentation plug-in 16a and the tracking plug-in 16b are described in commonly-assigned U.S. patent application Ser. No. 09/323,501, filed Jun. 1, 1999 for "Video Object Segmentation Using Active Contour Modelling With Global Relaxation," of Shijun Sun and Yongmin Kim, the content of which is incorporated herein by reference and made a part hereof.

The video object manager represents the segmented video objects either as polygons or binary masks. Polygons can be converted into binary masks by scan conversion. Binary masks can be converted into polygons by finding and linking the edges of the mask. A plug-in may access the video object in either format. The MPEG-4 plug-in is a conventional MPEG-4 encoder such as developed by the Microsoft Corporation of Redmond, Wash.

Processing Scenario

Figure 7:
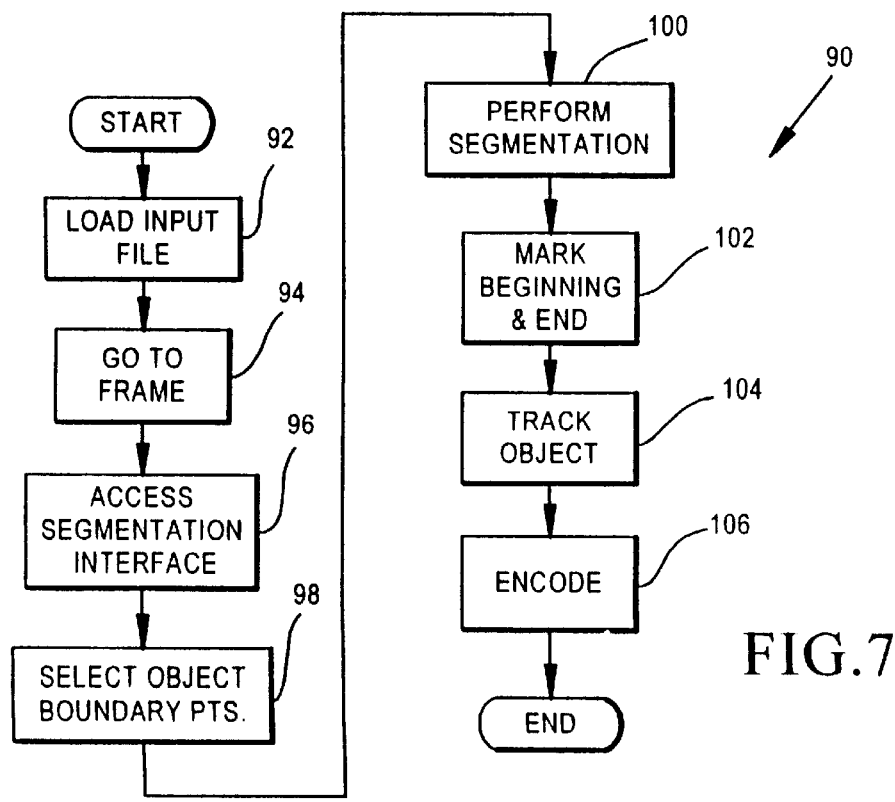
FIG. 7 is a flow chart for an exemplary processing scenario according to an embodiment of this invention.

Referring to FIG. 7, an exemplary processing scenario 90 commences at step 92 with the operator selecting a command to load in an input file. In one embodiment a dialogue box opens with a list of files in a select directory. The input file may be a still image or a video sequence 11 in any of a variety of conventional or proprietary formats. Once the file is loaded, the first frame is displayed in the video window 54. In addition, the time-line window 58 opens. If the file has predefined video objects then the time-lines 80 for such objects appear in the time-line window 58. If not, then just the video sequence time-line 72 and thumb print views 74 are shown.

The operator may access the VCR-like controls of the video window 54 to play back or move around in the input video sequence 11. Alternatively, the operator may click on a location along the time-line 72 to select a frame to view in video window 54. Using one of these procedures, at step 94 the operator moves to a desired video frame. Consider the example where the operator desires to track or extract an object within the video sequence. For example, the video sequence 11 may include motion video of a person. The operator may desire to extract the view of the person and apply the view to a different background. Or, perhaps there is an object that is moving quite fast and is not well-defined. To perform some video process of extraction or enhancement, a segmentation process and tracking process is to be performed on all or a portion of the video sequence.

Figure 8:
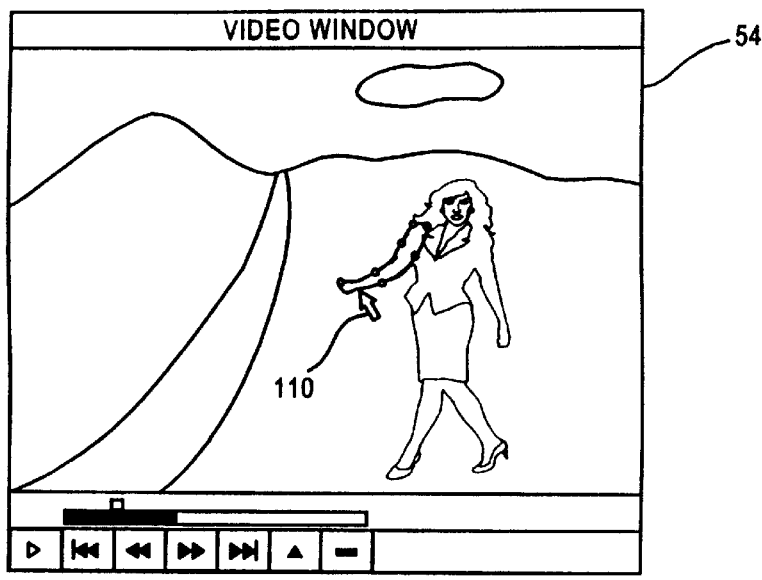
FIG. 8 is a window depiction of a subordinate video window of the user interface of FIG. 3 according to one embodiment of this invention.
Figure 9:
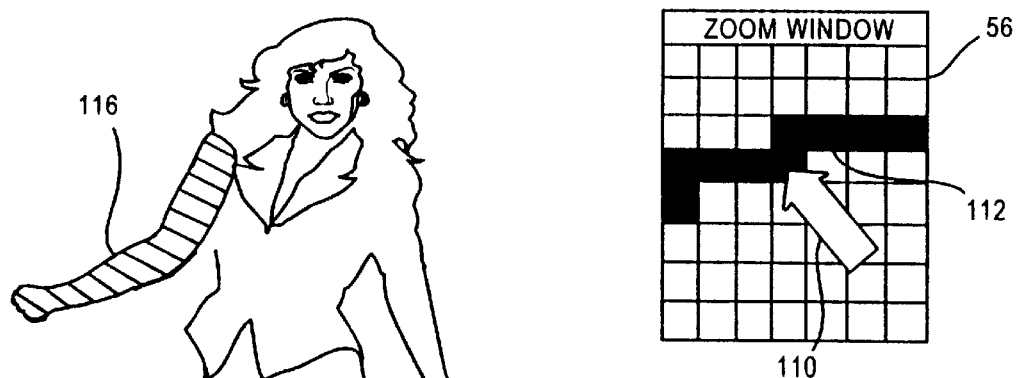
FIG. 9 is a window depiction of a subordinate zoom window of the user interface of FIG. 3 according to one embodiment of this invention.
Figure 10:
FIG. 10 is a depiction of a portion of a video image showing a video object as designated by a translucent mask overlaying the object according to an embodiment of this invention.

At step 96, the operator accesses the segmentation interface 44 (such as by accessing a set of commands from a pull-down menu). The operator selects a command to define a video object. At step 98, the operator then clicks on points at the peripheral edge of the desired object as shown in FIG. 8. In doing so, the operator is making a polygon of line segments. As previously described, the zoom window 56 (see FIG. 9) allows the operator to better see the surrounding region near the location of a cursor 110 of a mouse or other pointing device. Referring to FIG. 9, the region near the cursor 110 is shown in the zoom window 56 with sufficient precision to click on a selected pixel 112 of the video window 54. In particular each pixel of the video window 54 in the vicinity of the pointer 110 is displayed as a large block of pixels on the zoom window 56. Using window 56 to guide the cursor movement in window 54, the operator selects a pixel in window 54, and the change is reflected in pixel block 112 of window 56. As a result the operator is able to make a very accurate selection of object boundary points. Referring to FIG. 10, once the operator indicates that the selection of boundary points is complete the boundary is closed. Once the selection of points is complete, segmentation can occur. At step 100 a segmentation plug-in is activated. The segmentation plug-in receives the video frame data and the object points from the shell 14 and the segmentation plug-in API 18. The segmentation plug-in redefines the edges of the object in the video frame from being a large-segmented polygon to a more semantically-accurate object edge. An edge derivation process is performed as part of the segmentation process to estimate where there is a semantically-accurate edge (e.g., edge of man distinct from background).

In defining the video object the operator is able to select a method of highlighting the object. Among the various methods are overlaying a translucent mask 116 (see FIG. 10) which adds a color shade to the video data for the object. For example, the operator may select a color filter for a given object. Different objects are assigned differing colors to allow the operator to see the various video objects defined in a given video frame. Alternatively, a thick line can be selected to outline the object. Other methods include showing the video object in black and white or normal color while showing the background in the opposite, or making the background black, white or another pattern. In various embodiments any of many kinds of filtering operations can be performed to visually distinguish the video object from the portions of the video frame which are not part of one or more defined video objects. The video object itself is the original video pixel data. The overlayed mask or the filtered alteration of displayed data serves as a visual cue for distinguishing the video object from the remaining portion of a video frame.

Rather than have the operator go through every frame manually and select object points, an automatic segmentation is achieved using a tracking plug-in. At step 102 an operator selects a starting video frame and an ending video frame. This is done in the time-line window 58. Time-line 72 displays a line 76 indicating the starting frame, a line 78 indicating the ending frame and a marker 81 indicating the location along the time-line of the frame currently displayed in video window 54. With the segmentation active and the tracking active, the operator plays the desired portion of the video sequence from the selected starting point 76 to the selected ending point 78 at step 104 to accomplish tracking of the video object(s). For each frame, the tracking plug-in receives the video frame data for a current frame, along with the object data from the prior frame. The tracking plug-in then identifies the object in the current frame. In some embodiments the segmentation plug-in automatically refines the object definition for such frame. In other embodiments, segmentation is performed only when specified by the operator. For example, the operator may see the tracking program is starting to include additional pixels or exclude pixels of the semantically correct object. As a result, the operator goes to the frame where such tracking error commences. The operator can now redefine the object or alternatively define the video object into a set of video sub-objects. Each sub-object then is tracked using different segmentation and tracking plug-ins from that point to the end point 78. Another use for defining video sub-objects is where there is a hole or transparent part of the video object which shows a moving background. By excluding the inner hole portion, a sub-object representing the rest of the imaged object without the hole is tracked as a video sub-object.

Once the video object has been accurately tracked to the operator's satisfaction, the operator can perform image processing enhancement or another desired function as available from one of the plug-ins 16. In one example, the operator may save just the video object in a sequence (e.g., a sequence of a man extracted from the input video sequence, where the man is shown against some predefined or other background.) In such example, the video sub-objects forming an object are combined with the aggregate video object being saved as a separate video sequence. The separate sequence may stand-alone (e.g., object on some predefined background) or be combined with another video clip, in effect overlaying the video object onto another video sequence.

At some point, the operator makes a determination to save a video clip as an encoded output file. Such encoded output file may become an input video sequence at a later time, or may be a canned clip exported for viewing on a display device outside the processing environment 10. In a preferred embodiment an MPEG-4 encoder is included as a plug-in. At step 106, the operator selects the MPEG-4 encoder to compress a video clip and create an output file. Unless previously combined, any video sub-objects which together form a video object are combined into an aggregate video object prior to encoding.

As previously described, an encoding progress display 86 allows the operator to analyze the output quality by viewing the peak signal to noise ratio per component or per number of bits used in encoding. In addition, the operator can alter some encoding parameters, such as bit rate, motion vector search range and fidelity of encoded shape. The operator can view the results for many different encodings to find the encoding settings that provide the desired trade-off to achieve a satisfactory image quality at some number of bits encoded per pixel.

Meritorious and Advantageous Effects

According to an advantage of this invention, various processing needs can be met using differing plug-ins. According to another advantage of the invention, the processing shell provides isolation between the user interface and the plug-ins. Plug-ins do not directly access the video encoder. The plug-ins accomplish segmentation or tracking or another task by interfacing through an API—application program interface module. For example, a segmentation plug-in defines an object and stores the pertinent data in a video object manager portion of the shell. The encoder retrieves the video objects from the video object manager. Similarly, plug-ins do not directly draw segmentations on the screen, but store them in a central location. A graphical user interface module of the user interface retrieves the data from central location and draws the objects in the video window. As a result, the various plug-ins are insulated from the intricacies of reading various file formats. Thus, data can even be captured from a camcorder or downloaded over a network through the user interface and shell, without regard for plug-in compatibilities.

An advantage of the automatically scrolling zoom window is that the operator may view a location within the video frame, while also viewing a close-up of such location in the zoom window. This allows the operator to precisely place a point on a An advantage of the encoding progress display is that the operator is able to visualize how peak signal to noise ratio varies between video objects over a sequence of frames or how the total number of bits affects the peak signal to noise ratio of each component of an object. When the image quality is unsatisfactory, these displays enable the operator to identify a parameter in need of adjusting to balance peak signal to noise ratio and the bit rate.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for interactively processing a video sequence on a system having a display, an input device, and a processor, the method comprising the steps of:

displaying a video frame of the video sequence in a display window;

selecting a specific video object portion of the displayed video frame by outlining a boundary along the selected specific video object within the video frame, wherein the boundary distinguishes a specific video object from a background around said specific video object;

segmenting the outlined video object;

displaying in a first display window the segmented video object;

tracking the video object among a plurality of video frames of the video sequence;

displaying in a second display window which is concurrently active with the first display window at least one time-line, the time-line corresponding to a the video sequence, including the plurality of video frames and being allocated to indicate information for the video object; and for the video object, marking on the time-line allocated to the video object, an indication of each video frame of the video sequence in which the video object has been tracked.

2. The method of claim 1, in which the step of displaying the video object, comprises, applying a translucent mask to a portion of the video frame corresponding to the segmented video object, and displaying the masked portion of the video frame against a remaining portion of the video frame.

3. The method of claim 2, in which the step of applying comprises:

applying a mask of a selectable color to said portion, and wherein the step of displaying the masked portion results in displaying the segmented video object with a translucent masking of said selectable color.

4. The method of claim 1, in which the step of displaying the segmented video object comprises displaying the segmented video object among a remaining portion of the video frame, wherein the segmented video object is displayed in either one of black and white or color and the remaining portion is displayed in the other of black and white or color.

5. The method of claim 1, in which the step of displaying the segmented video object comprises displaying the segmented video object over a predefined background.

6. The method of claim 1, further comprising the steps of:

accessing an interface for selecting among a plurality of computer program plug-ins, each plug-in being for processing video information pertaining to at least one video frame.

7. The method of claim 6, in which the step of accessing occurs prior to the step of segmenting, the method further comprising:

selecting a segmentation program from the plurality of computer program plug-ins to perform the segmenting step.

8. The method of claim 6, further comprising:

selecting a tracking program from the plurality of computer program plug-ins;

tracking the video object among a plurality of video frames using the selected tracking program.

9. A method for interactively processing a video sequence on a system having a display, an input device, and a processor, the method comprising the steps of:

displaying a video frame in a display window;

selecting a specific video object portion of the video frame by outlining a boundary along the selected specific video object within the video frame, wherein the boundary distinguishes a specific video object from a background around said specific video object;

segmenting the outlined video object; and displaying in a first display window the segmented video object;

accessing an interface for selecting among a plurality of computer program plug-ins, each plug-in being for processing video information pertaining to at least one video frame;

selecting a tracking program from the plurality of computer program plug-ins;

tracking the video object among a plurality of video frames;

displaying in a second display window which is concurrently active with the first display window at least one time-line, the time-line corresponding to a sequence of video frames including the plurality of video frames and being allocated to indicate information for the video object; and for the video object, marking on the time-line allocated to the video object, an indication of each video frame in which the video object has been tracked.

10. A digital processor readable storage medium for storing processor-executable instructions and processor-accessible data for maintaining an interactive video processing environment of display windows in response to user inputs, the medium comprising:

code means for displaying a video frame in a display window;

code means for selecting a specific video object portion of the video frame by outlining a boundary along the selected specific video object within the video frame, wherein the boundary distinguishes a specific video object from a background around said specific video object;

code means for displaying in a first display window a segmented video object;

code means for tracking the video object among a plurality of video frames;

code means for displaying in a second display window which is concurrently active with the first display window at least one time-line, the time-line corresponding to a sequence of video frames including the plurality of video frames and being allocated to indicate information for the video object; and code means for marking on the time-line allocated to the video object, an indication of each video frame in which the video object has been tracked.

11. The medium of claim 10, further comprising:

code means for defining a translucent mask for a portion of the video frame corresponding to the segmented video object; and code means for displaying the masked portion of the video frame against a remaining portion of the video frame.

12. The medium of claim 11, in which the defining code means applies a mask of a selectable color to said portion, and wherein the code means for displaying the masked portion causes the segmented video object to be displayed with a translucent masking of said selectable color.

13. The medium of claim 10, in which the code means for displaying the segmented video object is for displaying the segmented video object among a remaining portion of the video frame, wherein the segmented video object is displayed in either one of black and white or color and the remaining portion is displayed in the other of black and white or color.

14. The medium of claim 10, in which the code means for displaying the segmented video object is for displaying the segmented video object over a predefined background.

15. The medium of claim 10, further comprising:

code means for maintaining an interface for selecting among a plurality of computer program plug-ins, each plug-in being for processing video information pertaining to at least one video frame.

16. A system including a display, an input device, and a processor, the system for generating an interactive video processing environment, the system further comprising:

means for displaying a video frame in a display window;

means for outlining a boundary of a video object within the video frame;

means for displaying in a first display window a segmented video object;

means for tracking the video object among a plurality of video frames;

means for displaying in a second display window which is concurrently active with the first display window at least one time-line, the time-line corresponding to a sequence of video frames including the plurality of video frames and being allocated to indicate information for the video object; and means for marking on the time-line allocated to the video object, an indication of each video frame in which the video object has been tracked.

17. The system of claim 16, further comprising:

means for defining a translucent mask for a portion of the video frame corresponding to the segmented video object; and means for displaying the masked portion of the video frame against a remaining portion of the video frame.

18. The system of claim 16, in which the defining means applies a mask of a selectable color to said portion, and wherein the means for displaying the masked portion causes the segmented video object to be displayed with a translucent masking of said selectable color.

19. The system of claim 16, in which the means for displaying the segmented video object is for displaying the segmented video object among a remaining portion of the video frame, wherein the segmented video object is displayed in either one of black and white or color and the remaining portion is displayed in the other of black and white or color.

20. The system of claim 16, in which the means for displaying the segmented video object is for displaying the segmented video object over a predefined background.

21. The system including system of claim 16, further comprising:

an interface for selecting among a plurality of computer program plug-ins, each plug-in being for processing video information pertaining to at least one video frame.

22. A system including a display, an input device, and a processor, the system for generating an interactive video processing environment, the system further comprising:

means for displaying a video frame in a display window;

means for selecting a semantically meaningful video object portion of the video frame by outlining a boundary along the selected semantically meaningful video object within the video frame, wherein the boundary distinguishes a semantically meaningful video object from a background around said semantically meaningful video object;

means for displaying in a first display window a segmented video object;

means for tracking the video object among a plurality of video frames;

means for displaying in a second display window which is concurrently active with the first display window at least one time-line, the time-line corresponding to a sequence of video frames including the plurality of video frames and being allocated to indicate information for the video object; and means for marking on the time-line allocated to the video object, an indication of each video frame in which the video object has been tracked.

\* \* \* \* \*